(12) United States Patent
Kindberg

(10) Patent No.: US 10,053,074 B2
(45) Date of Patent: Aug. 21, 2018

(54) SAFETY BRAKE DEVICE AND METHOD FOR SAFETY BRAKING OF AN AUTONOMOUS VEHICLE

(71) Applicant: VOLVO CAR CORPORATION, Gothenburg (SE)

(72) Inventor: Leif Kindberg, Jorlanda (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 15/202,930

(22) Filed: Jul. 6, 2016

(65) Prior Publication Data

US 2017/0015291 A1 Jan. 19, 2017

(30) Foreign Application Priority Data

Jul. 13, 2015 (EP) ..................................... 15176442

(51) Int. Cl.
| | |
|---|---|
| *B60T 11/10* | (2006.01) |
| *B60T 7/12* | (2006.01) |
| *B60T 17/18* | (2006.01) |
| *B60T 8/17* | (2006.01) |
| *B60T 8/171* | (2006.01) |
| *B60T 11/26* | (2006.01) |
| *B60T 11/28* | (2006.01) |

(52) U.S. Cl.
CPC ............... *B60T 11/103* (2013.01); *B60T 7/12* (2013.01); *B60T 8/1701* (2013.01); *B60T 8/171* (2013.01); *B60T 11/26* (2013.01); *B60T 11/28* (2013.01); *B60T 17/18* (2013.01)

(58) Field of Classification Search
CPC ........ B60T 11/103; B60T 11/26; B60T 11/28; B60T 11/18; B60T 7/12; B60T 8/1701; B60T 8/171
See application file for complete search history.

(56) References Cited

U.S. PATENT DOCUMENTS 3,687,082 A * 8/1972 Burke, Jr. ............. B60L 15/002
    104/298
4,023,753 A * 5/1977 Dobler ................... B61L 23/005
    246/122 R (Continued)

FOREIGN PATENT DOCUMENTS

DE 102012212090 A1 1/2014

OTHER PUBLICATIONS

Extended European Search Report dated Jan. 21, 2016, Application No. 15176442.0-1756—Applicant Volvo Car Corporation, 6 Pages.

*Primary Examiner* — Vishal R Sahni
(74) *Attorney, Agent, or Firm* — Brooks Kushman P.C.

(57) ABSTRACT

Disclosed herein are a safety brake device and method for safety braking using a hydraulic brake system including hydraulic wheel brakes of an autonomous vehicle, the autonomous vehicle further having an electrical power supply and signaling system for enabling an autonomous drive mode. The method comprises pressurizing a pressure storage canister containing brake fluid, monitoring electrical power supplies and signaling of the autonomous vehicle, and releasing brake fluid into the hydraulic brake system of the autonomous vehicle to activate the wheel brakes thereof upon determining loss of at least one of electrical power and signaling of the autonomous vehicle. Disclosed herein is also an autonomous vehicle comprising a safety brake.

18 Claims, 2 Drawing Sheets

(56) References Cited

U.S. PATENT DOCUMENTS

| | | | |
|---|---|---|---|
| 2005/0027410 A1* | 2/2005 | Kanner | B61L 27/0094 |
| | | | 701/19 |
| 2005/0029864 A1* | 2/2005 | Bauer | B60T 7/12 |
| | | | 303/191 |
| 2007/0198145 A1* | 8/2007 | Norris | H04L 67/12 |
| | | | 701/23 |
| 2011/0316327 A1* | 12/2011 | Rekow | B60T 7/12 |
| | | | 303/3 |
| 2013/0253793 A1* | 9/2013 | Lee | B60W 50/029 |
| | | | 701/70 |
| 2016/0114779 A1* | 4/2016 | Binder | B60T 7/042 |
| | | | 701/76 |

* cited by examiner

SAFETY BRAKE DEVICE AND METHOD FOR SAFETY BRAKING OF AN AUTONOMOUS VEHICLE

CROSS-REFERENCE TO RELATED APPLICATIONS

This application claims foreign priority benefits under 35 U.S.C. § 119(a)-(d) to European patent application number EP 15176442.0, filed Jul. 13, 2015, which is incorporated by reference in its entirety.

TECHNICAL FIELD

The present disclosure relates to a safety brake device adapted for an hydraulic brake system including hydraulic wheel brakes of an autonomous vehicle further having an electrical power supply and signaling system for enabling an autonomous drive mode. The disclosure further relates to a method for safety braking using a hydraulic brake system including hydraulic wheel brakes of an autonomous vehicle further having an electrical power supply and signaling system for enabling an autonomous drive mode. The disclosure further relates to an autonomous vehicle having an hydraulic brake system including hydraulic wheel brakes and the autonomous vehicle further having an electrical power supply and signaling system for enabling an autonomous drive mode.

BACKGROUND

One area of automotive vehicle technology that is evolving rapidly is the area of autonomous or semi-autonomous drive capabilities. This is enabled through the introduction of sensors, for sensing vehicle parameters and surroundings, and actuators, for controlling different vehicle functionalities, such as steering, throttling and braking. Increased on-board data processing capabilities ties together these sensors and actuators such that the autonomous or semi-autonomous drive capabilities are enabled.

When the vehicle runs in autonomous mode, which means the driver is not required to perform maneuvers, the vehicle usually is dependent on multiple data sources as inputs to perform the autonomous driving, such as detection of surrounding vehicles, traffic lanes, obstacles, data from navigation systems and so on. Provisions of such inputs are usually dependent on electrical power supplies and signaling systems for enabling the autonomous drive mode. However, should one or more of these inputs not be available, e.g., due to a problem in the electrical power supplies and signaling systems, there might not be sufficient information to perform autonomous driving.

A previously known solution to handle a situation where there is no longer any electrical energy or any fluidic pressure available in an autonomous vehicle owing to a fault is described in US2005029864 (A1).

US2005029864 (A1) relates to a brake system for a vehicle that can be operated without a driver. It has a service brake device, a parking brake device and an emergency braking device. At least the wheel brake devices of the wheels of one axle of the vehicle have emergency brake actuators which switchover the assigned wheel brake devices into the braking state as a result of the triggering of an emergency braking operation. The emergency braking operation can be triggered either manually by means of an emergency operator control device or automatically by means of a monitoring device if the latter has detected an unacceptable operating state of the vehicle in the driverless operating mode. As soon as the monitoring device detects an unacceptable operating state said monitoring device brings about a corresponding triggering signal which triggers the emergency braking operation. Emergency brake actuators are expediently mechanically pre-stressed into a position of rest in such a way that when the emergency brake actuators are in the position of rest the assigned wheel brake devices are in the braking state. The wheel brake devices are capable of being switched over, by acting appropriately on the emergency brake actuators, fluidically and/or electrically between the braking state and an enabling state which enables the assigned wheels of the vehicle. This permits an emergency braking operation to be carried out even if there is no longer any electrical energy or any fluidic pressure available in the vehicle owing to a fault. The emergency brake actuators may be formed by spring brake cylinders.

Thus, the pre-stressed spring brake cylinders according to US2005029864 (A1) will be brought into the position of rest by the springs in such a way that the assigned wheel brake devices are brought into the braking state for performing an emergency braking operation if the monitoring device has detected an unacceptable operating state of the vehicle, such as absence of electrical energy, whilst in the driverless operating mode. Thus it is suggested that the vehicle can be stopped safely and quickly, for example in order to prevent an accident.

However, there is still room for improvements relating to safely bringing an autonomous vehicle to a halt in case of a fault rendering the control systems of the autonomous vehicle unable to perform autonomous driving.

SUMMARY

Embodiments herein aim to provide an improved safety brake device capable to safely bring an autonomous vehicle to a halt in case of a fault rendering the control systems thereof unable to perform autonomous driving.

This is provided through a safety brake device adapted for an hydraulic brake system including hydraulic wheel brakes of an autonomous vehicle further having an electrical power supply and signaling system for enabling an autonomous drive mode, wherein the safety brake device comprises: a pressure storage canister adapted to contain brake fluid; an electrical power and signaling connector, connectable to an electrical power and signaling system of an autonomous vehicle; a supervisor ECU for monitoring electrical power supplies and signaling of a connected autonomous vehicle; a pressure pump connected to the pressure storage canister via an inlet valve; an hydraulic brake system connector connected to the pressure storage canister via a pressure application valve and connectable to an hydraulic brake system of an autonomous vehicle; where the pressure pump, the inlet valve and the pressure application valve also are adapted to be controlled by the supervisor ECU; and the supervisor ECU is arranged to open the pressure application valve to release brake fluid into a connected hydraulic brake system of an autonomous vehicle to activate the wheel brakes thereof upon determining loss of at least one of electrical power and signaling of the connected autonomous vehicle.

According to a second aspect is provided that the supervisor ECU further is arranged to selectively open the inlet valve and operate the pressure pump to apply pressure to the pressure storage canister pressurizing brake fluid contained therein.

The provision of the supervisor ECU being arranged to selectively open the inlet valve and operate the pressure pump to apply pressure to the pressure storage canister pressurizing brake fluid contained therein ensures that the safety braking device can be made ready to bring the vehicle safely to a halt should loss of at least one of electrical power and signaling of the connected autonomous vehicle be determined.

According to a third aspect is provided that the supervisor ECU further is arranged to monitor the pressure available in the pressure storage canister.

The provision of the supervisor ECU being arranged to monitor the pressure available in the pressure storage canister provides for ensuring that sufficient pressure will be available for bringing the vehicle safely to a halt should it be required.

According to a fourth aspect is provided that the supervisor ECU further is arranged to prohibit engagement of an autonomous drive mode of a connected autonomous vehicle unless a predetermined pressure is available in the pressure storage canister.

The provision of the supervisor ECU being arranged to prohibit engagement of an autonomous drive mode of a connected autonomous vehicle unless a predetermined pressure is available in the pressure storage canister provides for ensuring that autonomous driving only can be performed if the safety brake device is ready to bring the vehicle safely to a halt should it be required to.

According to a fifth aspect is provided that the supervisor ECU further is arranged to selectively open the inlet valve and operate the pressure pump when a connected autonomous vehicle is an in autonomous drive mode to apply pressure to the pressure storage canister in order to maintain at least the predetermined pressure in the pressure storage canister pressurizing brake fluid contained therein.

The provision of the supervisor ECU being arranged to selectively open the inlet valve and operate the pressure pump when a connected autonomous vehicle is an in autonomous drive mode to apply pressure to the pressure storage canister in order to maintain at least the predetermined pressure in the pressure storage canister pressurizing brake fluid contained therein provides for ensuring that a sufficient pressure level for bringing the vehicle safely to a halt is maintained during the duration of an autonomous driving session.

According to a sixth aspect is provided that the safety brake device further comprises a drainage valve connected to the pressure storage canister and that the supervisor ECU further is arranged to open the drainage valve when exiting an autonomous drive mode of a connected autonomous vehicle such that pressure is drained from the pressure storage canister for de-pressurizing brake fluid contained therein.

The provision of a drainage valve connected to the pressure storage canister and the supervisor ECU being arranged to open the drainage valve when exiting an autonomous drive mode of a connected autonomous vehicle such that pressure is drained from the pressure storage canister for de-pressurizing brake fluid contained therein provides for relieving any pressure induced stress from the safety brake device when its services are not required.

According to a seventh aspect is provided that the supervisor ECU further is arranged to open the inlet valve in reverse as drainage valve whilst the pressure pump is inactive or operated in reverse to assist in draining pressure from the pressure storage canister for de-pressurizing brake fluid contained therein.

The provision of the supervisor ECU being arranged to open the inlet valve in reverse as drainage valve whilst the pressure pump is inactive or operated in reverse to assist in draining pressure from the pressure storage canister for de-pressurizing brake fluid contained therein provides a simple and cost efficient solution, utilizing components already present, thus reducing complexity and cost of the safety brake device.

Embodiments herein also aim to provide an improved method for safely bringing an autonomous vehicle to a halt in case of a fault rendering the control systems thereof unable to perform autonomous driving.

Thus, according to an eight aspect this is provided through a method for safety braking using an hydraulic brake system including hydraulic wheel brakes of an autonomous vehicle further having an electrical power supply and signaling system for enabling an autonomous drive mode, wherein the method comprises: pressurizing a pressure storage canister containing brake fluid; monitoring electrical power supplies and signaling of the autonomous vehicle; releasing brake fluid into the hydraulic brake system of the autonomous vehicle to activate the wheel brakes thereof upon determining loss of at least one of electrical power and signaling of the autonomous vehicle.

According to a ninth aspect is provided that that the method further comprises selectively opening an inlet valve and operating a pressure pump to apply pressure to the pressure storage canister pressurizing brake fluid contained therein.

The provision of selectively opening an inlet valve and operating a pressure pump to apply pressure to the pressure storage canister pressurizing brake fluid contained therein ensures that the safety braking device can be made ready to bring the vehicle safely to a halt should loss of at least one of electrical power and signaling of the autonomous vehicle be determined.

According to a tenth aspect is provided that the method further comprises monitoring the pressure available in the pressure storage canister.

The provision of monitoring the pressure available in the pressure storage canister provides for ensuring that sufficient pressure will be available for bringing the vehicle safely to a halt should it be required.

According to an eleventh aspect is provided that the method further comprises prohibiting engagement of an autonomous drive mode of the autonomous vehicle unless a predetermined pressure is available in the pressure storage canister.

The provision of prohibiting engagement of an autonomous drive mode of the autonomous vehicle unless a predetermined pressure is available in the pressure storage canister provides for ensuring that autonomous driving only can be performed if safe braking to bring the vehicle safely to a halt should it be required to is available.

According to a twelfth aspect is provided that the method further comprises selectively opening an inlet valve and operating a pressure pump when the autonomous vehicle is an in autonomous drive mode applying pressure to the pressure storage canister maintaining at least the predetermined pressure in the pressure storage canister pressurizing brake fluid contained therein.

The provision of selectively opening an inlet valve and operating a pressure pump when the autonomous vehicle is an in autonomous drive mode applying pressure to the pressure storage canister maintaining at least the predetermined pressure in the pressure storage canister pressurizing brake fluid contained therein provides for ensuring that a sufficient pressure level for bringing the vehicle safely to a halt is maintained during the duration of an autonomous driving session.

According to an thirteenth aspect is provided that the method further comprises opening a drainage valve when exiting an autonomous drive mode of the autonomous vehicle draining pressure from the pressure storage canister de-pressurizing brake fluid contained therein.

The provision of opening a drainage valve when exiting an autonomous drive mode of the autonomous vehicle draining pressure from the pressure storage canister de-pressurizing brake fluid contained therein provides for relieving any pressure induced stress from the pressure storage canister.

According to an fourteenth aspect is provided that the method further comprises opening an inlet valve in reverse as drainage valve whilst keeping the pressure pump inactive or operated in reverse to assist in draining pressure from the pressure storage canister de-pressurizing brake fluid contained therein.

The provision of opening an inlet valve in reverse as drainage valve whilst keeping the pressure pump inactive or operated in reverse to assist in draining pressure from the pressure storage canister de-pressurizing brake fluid contained therein provides a simple and cost efficient realization of this method step.

According to a final aspect is provided an autonomous vehicle having a hydraulic brake system including hydraulic wheel brakes and the autonomous vehicle further having an electrical power supply and signaling system for enabling an autonomous drive mode, that comprises a safety brake device as above.

An autonomous vehicle as above is able to safely bring itself to a halt in case of a fault rendering the control systems thereof unable to perform autonomous driving.

BRIEF DESCRIPTION OF THE DRAWINGS

In the following, embodiments herein will be described in greater detail by way of example only with reference to attached drawings.

Still other objects and features of embodiments herein will become apparent from the following detailed description considered in conjunction with the accompanying drawings. It is to be understood, however, that the drawings are designed solely for purposes of illustration and not as a definition of the limits hereof, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION

Figure 1:
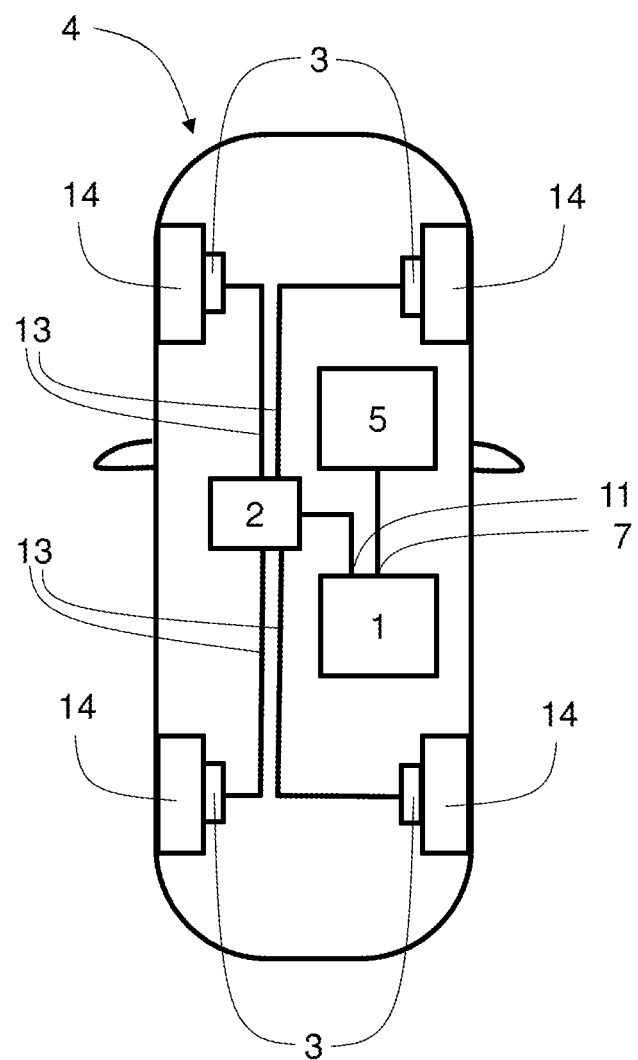
FIG. 1 is a schematic illustration of an autonomous vehicle comprising a safety brake device according to embodiments herein.

The present disclosure proposes, and illustrates in FIG. 1, a solution to provide an improved safety brake device 1 capable to safely bring an autonomous vehicle 4 to a halt in case of a fault rendering the control systems thereof unable to perform autonomous driving.

The autonomous vehicle 4 according to FIG. 1 comprises a hydraulic brake system 2, which is connected via brake lines 13 to hydraulic wheel brakes 3 arranged at the respective wheels 14 of the autonomous vehicle 4. The autonomous vehicle 4 further has an electrical power supply and signaling system 5, for enabling an autonomous drive mode by control systems thereof (not shown).

As illustrated in FIG. 1, the safety brake device 1 is connected to the hydraulic brake system 2 of the autonomous vehicle 4 via a hydraulic brake system connector 11, that may comprise an hydraulic brake line interconnecting the safety brake device 1 and the hydraulic brake system 2.

As further illustrated in FIG. 1, the safety brake device 1 is connected to the electrical power supply and signaling system 5 of the autonomous vehicle 4 via a signaling connector 7, that may include one or more sets of wiring for electrical power and data signaling.

Further details of the autonomous vehicle 4 are intentionally left out from FIG. 1, in order to not unnecessarily obscure details promoting the understanding of the safety brake device 1 according to the present disclosure. However, the person skilled in the art will readily be able to envisage such further details.

Figure 2:
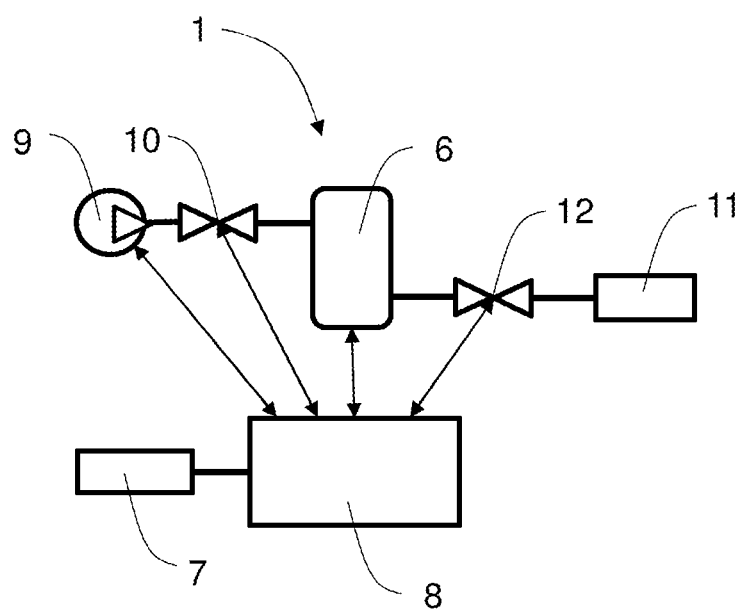
FIG. 2 is a schematic illustration of a safety brake device according to embodiments herein.

FIG. 2 illustrates further constituents of a first embodiment of a safety brake device 1 adapted for an hydraulic brake system 2 including hydraulic wheel brakes 3 of an autonomous vehicle 4 further having an electrical power supply and signaling system 5 for enabling an autonomous drive mode.

The safety brake device 1 comprises a pressure storage canister 6 adapted to contain brake fluid (not shown), such as brake fluid conventionally used in a hydraulic brake system 2 of a vehicle 4. Further is provided an electrical power and signaling connector 7, which is connectable to an electrical power supply and signaling system 5 of an autonomous vehicle 4.

A supervisor electronic control unit, hereinafter called supervisor ECU 8 is provided for monitoring electrical power supplies and signaling of a connected autonomous vehicle 4. For example, the ECU 8 may monitor the electrical power supply and signaling system 5.

A pressure pump 9 is connected to the pressure storage canister 6 via an inlet valve 10, and a hydraulic brake system connector 11 is connected to the pressure storage canister 6 via a pressure application valve 12.

The hydraulic brake system connector 11 is further connectable to a hydraulic brake system 2 of an autonomous vehicle 4, such that brake fluid may be transferred thereto.

The pressure pump 9, the inlet valve 10 and the pressure application valve 12 are all adapted to be controlled by the supervisor ECU 8, as illustrated by arrows in FIG. 2, and the supervisor ECU 8 is arranged to open the pressure application valve 12 to release brake fluid into a connected hydraulic brake system 2 of an autonomous vehicle 4 to activate the wheel brakes 3 thereof upon determining loss of at least one of electrical power and signaling of the connected autonomous vehicle 4. Thus the autonomous vehicle 4 can be brought safely to a halt in case of a fault rendering the control systems thereof unable to perform autonomous driving.

In some embodiments the supervisor ECU 8 is further arranged to selectively open the inlet valve 10 and operate the pressure pump 9 to apply pressure to the pressure storage canister 6 pressurizing brake fluid contained therein. This ensures that the safety braking device can be made ready, i.e., the brake fluid contained therein pressurized, such that it will be possible to bring the autonomous vehicle 4 safely to a halt should loss of at least one of electrical power and signaling of the connected autonomous vehicle 4 be determined.

In yet some embodiments the supervisor ECU 8 is further arranged to monitor the pressure available in the pressure storage canister 6, illustrated by an arrow in FIG. 2. This ensures that sufficient pressure will be available for bringing the autonomous vehicle 4 safely to a halt should loss of at least one of electrical power and signaling of the connected autonomous vehicle 4 be determined.

In still further embodiments the supervisor ECU 8 is further arranged to prohibit engagement of an autonomous drive mode of a connected autonomous vehicle 4 unless a predetermined pressure is available in the pressure storage canister 6. This ensures that autonomous driving only can be performed if the safety brake device 1 is ready to bring the autonomous vehicle 4 safely to a halt should loss of at least one of electrical power and signaling of the connected autonomous vehicle 4 be determined.

In accordance with some embodiments the supervisor ECU 8 is further arranged to selectively open the inlet valve 10 and operate the pressure pump 9 when a connected autonomous vehicle 4 is an in autonomous drive mode, to apply pressure to the pressure storage canister 6 in order to maintain at least the predetermined pressure in the pressure storage canister 6, thus pressurizing brake fluid contained therein. This ensures that a sufficient pressure level for bringing the autonomous vehicle 4 safely to a halt is maintained in the pressure storage canister 6 during the duration of an autonomous driving session.

In order to relieve any pressure induced stress from the safety brake device 1, and in particular from the pressure storage canister 6 thereof, when the autonomous vehicle 4 is no longer to be operated autonomously, the safety brake device 1, according to some further embodiments, comprises a drainage valve connected to the pressure storage canister 6, and the supervisor ECU 8 is further arranged to open the drainage valve when exiting an autonomous drive mode of a connected autonomous vehicle 4. Thus, hereby pressure is drained from the pressure storage canister 6 de-pressurizing brake fluid contained therein as the autonomous vehicle 4 exits an autonomous drive mode.

In order to reduce the complexity and cost of the safety brake device 1, it is suggested in some further embodiments, that the supervisor ECU 8 further is arranged to open the inlet valve 10 in reverse as drainage valve whilst the pressure pump 9 is inactive or operated in reverse to assist in draining pressure from the pressure storage canister 6 for de-pressurizing brake fluid contained therein. This provides for a simple and cost efficient solution, utilizing components already present in the safety brake device 1.

Embodiments herein also aim to provide an improved method for safely bringing an autonomous vehicle 4 to a halt in case of a fault rendering the control systems thereof unable to perform autonomous driving.

Thus, the present disclosure also proposes a method for safety braking using an hydraulic brake system 2 including hydraulic wheel brakes 3 of an autonomous vehicle 4, the autonomous vehicle 4 further having an electrical power supply and signaling system 5 for enabling an autonomous drive mode thereof.

The method comprises: pressurizing a pressure storage canister 6 containing brake fluid; monitoring electrical power supplies and signaling of the autonomous vehicle 4; releasing brake fluid into the hydraulic brake system 2 of the autonomous vehicle 4 to activate the wheel brakes 3 thereof upon determining loss of at least one of electrical power and signaling of the autonomous vehicle 4.

In some embodiments the method further comprises selectively opening an inlet valve 10 and operating a pressure pump 9 to apply pressure to the pressure storage canister 6 pressurizing brake fluid contained therein. Hereby is ensured that the autonomous vehicle 4 can be brought safely to a halt should loss of at least one of electrical power and signaling of the autonomous vehicle 4 be determined.

In yet some further embodiments the method further comprises monitoring the pressure available in the pressure storage canister 6. This ensures that sufficient pressure will be available to bring the autonomous vehicle 4 safely to a halt should it be required.

According to still some further embodiments the method further comprises prohibiting engagement of an autonomous drive mode of the autonomous vehicle 4 unless a predetermined pressure is available in the pressure storage canister 6. Hereby is ensured that autonomous driving only can be performed if safe braking to bring the autonomous vehicle 4 safely to a halt is available should it be necessary to do so.

In yet some embodiments the method further comprises selectively opening an inlet valve 10 and operating a pressure pump 9 when the autonomous vehicle 4 is an in autonomous drive mode, thus applying pressure to the pressure storage canister 6 for maintaining at least the predetermined pressure in the pressure storage canister 6, thus pressurizing brake fluid contained therein. This serves to ensure that a sufficient pressure level for bringing the autonomous vehicle 4 safely to a halt is maintained during the duration of an autonomous driving session of the autonomous vehicle 4.

According to still further embodiments the method further comprises opening a drainage valve when exiting an autonomous drive mode of the autonomous vehicle 4, thus draining pressure from the pressure storage canister 6 and thereby de-pressurizing brake fluid contained therein. This serves to relieve any pressure induced stress from the pressure storage canister 6 when the ability to safely bring the autonomous vehicle 4 safely to a halt is no longer required.

In some still further embodiments the method further comprises opening an inlet valve 10 in reverse as drainage valve whilst keeping the pressure pump 9 inactive or operated in reverse to assist in draining pressure from the pressure storage canister 6, thus de-pressurizing brake fluid contained therein. This provides a simple and cost efficient realization for performing drainage of pressure from the pressure storage canister 6.

Finally, the present disclosure also proposes an autonomous vehicle 4 having an hydraulic brake system 2 including hydraulic wheel brakes 3 and the autonomous vehicle 4 further having an electrical power supply and signaling system 5 for enabling an autonomous drive mode, that comprises a safety brake device 1 as described above.

An autonomous vehicle 4, as described above, is able to safely bring itself to a halt in case of a fault rendering the control systems thereof unable to perform autonomous driving, in particular due to loss of at least one of electrical power and signaling of the autonomous vehicle 4.

As one skilled in the art would understand, the electrical power supply and signaling system 5 and the supervisor ECU 8 may each include suitable hardware and/or software, such as one or more processors (e.g., one or more microprocessors, microcontrollers and/or programmable digital signal processors) in communication with, or configured to communicate with, one or more storage devices or media including computer readable program instructions that are executable by the one or more processors so that the electrical power supply and signaling system 5 and the supervisor ECU 8 may perform particular algorithms represented by the functions and/or operations described herein. Each of the electrical power supply and signaling system 5 and the supervisor ECU 8 may also, or instead, include one or more application specific integrated circuits, programmable gate arrays or programmable array logic, programmable logic devices, or digital signal processors.

The above-described embodiments may be varied within the scope of the following claims.

Thus, while there have been shown and described and pointed out fundamental novel features of the embodiments herein, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are equivalent. Moreover, it should be recognized that structures and/or elements and/or method steps shown and/or described in connection with any disclosed form or embodiment herein may be incorporated in any other disclosed or described or suggested form or embodiment as a general matter of design choice.

What is claimed is:

1. A safety brake device adapted for use with a hydraulic brake system of an autonomous vehicle, the hydraulic brake system including hydraulic wheel brakes, and the autonomous vehicle further having an electrical power supply and signaling system for enabling an autonomous drive mode, the safety brake device comprising:
   a pressure storage canister adapted to contain brake fluid;
   an electrical power and signaling connector connectable to the electrical power supply and signaling system of the autonomous vehicle;
   a supervisor electronic control unit (ECU) for monitoring electrical power supply and signaling for autonomous drive mode control of the autonomous vehicle;
   a pressure pump connected to the pressure storage canister via an inlet valve;
   a hydraulic brake system connector connected to the pressure storage canister via a pressure application valve and connectable to the hydraulic brake system of the autonomous vehicle;
   wherein the pressure pump, the inlet valve and the pressure application valve are adapted to be controlled by the supervisor ECU, and wherein the supervisor ECU is configured to open the pressure application valve to release brake fluid from the pressure storage canister into the hydraulic brake system of the autonomous vehicle to activate the wheel brakes thereof upon determining loss of signaling for autonomous drive mode control of the autonomous vehicle.

2. The safety brake device according to claim 1 wherein the supervisor ECU further is operable to selectively open the inlet valve and operate the pressure pump to apply pressure to the pressure storage canister for pressurizing brake fluid contained therein.

3. The safety brake device according to claim 1 wherein the supervisor ECU further is configured to monitor the pressure available in the pressure storage canister.

4. The safety brake device according to claim 3 wherein the supervisor ECU further is configured to prohibit engagement of the autonomous drive mode of the autonomous vehicle when connected to the safety brake device unless a predetermined pressure is available in the pressure storage canister.

5. The safety brake device according to claim 4 wherein the supervisor ECU further is configured to selectively open the inlet valve and operate the pressure pump when the autonomous vehicle is in the autonomous drive mode to apply pressure to the pressure storage canister in order to maintain at least the predetermined pressure in the pressure storage canister pressurizing brake fluid contained therein.

6. The safety brake device according to claim 1 further comprising a drainage valve connected to the pressure storage canister, wherein the supervisor ECU further is configured to open the drainage valve when exiting the autonomous drive mode of the autonomous vehicle to drain pressure from the pressure storage canister for de-pressurizing brake fluid contained therein.

7. The safety brake according to claim 6 wherein the supervisor ECU further is configured to open the inlet valve in reverse while the pressure pump is inactive or operated in reverse to assist in draining pressure from the pressure storage canister for de-pressurizing brake fluid contained therein.

8. An autonomous vehicle comprising:
   a hydraulic brake system including hydraulic wheel brakes;
   an electrical power supply and signaling system for enabling an autonomous drive mode; and
   the safety brake device according to claim 1.

9. The safety brake device according to claim 1 wherein the supervisor ECU is configured to open the pressure application valve to release brake fluid into the hydraulic brake system of the autonomous vehicle to activate the wheel brakes thereof upon determining loss of electrical power of the autonomous vehicle.

10. A method for safety braking an autonomous vehicle using a hydraulic brake system including hydraulic wheel brakes of the autonomous vehicle, wherein the autonomous vehicle further has an electrical power supply and signaling system for enabling an autonomous drive mode, the method comprising:
    pressurizing a pressure storage canister containing brake fluid;
    monitoring electrical power supply and signaling for autonomous drive mode control of the autonomous vehicle;
    releasing brake fluid from the pressure storage canister into the hydraulic brake system of the autonomous vehicle to activate the wheel brakes thereof upon determining loss of signaling for autonomous drive mode control of the autonomous vehicle.

11. The method according to claim 10 wherein a pressure pump is connected to the pressure storage canister via an inlet valve, and the method further comprises selectively opening the inlet valve and operating the pressure pump to apply pressure to the pressure storage canister to pressurize brake fluid contained therein.

12. The method according to claim 10 further comprising monitoring pressure available in the pressure storage canister.

13. The method according to claim 12 further comprising prohibiting engagement of the autonomous drive mode of the autonomous vehicle unless a predetermined pressure is available in the pressure storage canister.

14. The method according to claim 13 wherein a pressure pump is connected to the pressure storage canister via an inlet valve, and the method further comprises selectively opening the inlet valve and operating the pressure pump when the autonomous vehicle is in the autonomous drive mode to apply pressure to the pressure storage canister to maintain at least the predetermined pressure in the pressure storage canister for pressurizing brake fluid contained therein.

15. The method according to claim 10 further comprising opening a drainage valve when exiting the autonomous drive mode of the autonomous vehicle to drain pressure from the pressure storage canister and de-pressurize brake fluid contained therein.

16. The method according to claim 14 further comprising opening a drainage valve when exiting the autonomous drive mode of the autonomous vehicle to drain pressure from the pressure storage canister and de-pressurize brake fluid contained therein.

17. The method according to claim 16 further comprising opening the inlet valve in reverse while keeping the pressure pump inactive or operated in reverse to assist in draining pressure from the pressure storage canister and de-pressurizing brake fluid contained therein.

18. The method according to claim 10 wherein the releasing step comprises releasing brake fluid into the hydraulic brake system of the autonomous vehicle to activate the wheel brakes thereof upon determining loss of electrical power of the autonomous vehicle.

* * * * *